(12) United States Patent
Ikegami et al.

(10) Patent No.: US 7,004,030 B2
(45) Date of Patent: Feb. 28, 2006

(54) ACCELERATION SENSOR

(75) Inventors: Naokatsu Ikegami, Saitama (JP); Takasumi Kobayashi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/671,427

(22) Filed: Sep. 26, 2003

(65) Prior Publication Data

US 2005/0097960 A1     May 12, 2005

Related U.S. Application Data

(60) Provisional application No. 60/413,912, filed on Sep. 27, 2002.

(51) Int. Cl.
*G01P 15/02* (2006.01)
(52) U.S. Cl. .................................. 73/514.38; 73/514.01
(58) Field of Classification Search ............. 73/514.01, 73/514.12, 514.32, 514.24, 514.36, 514.37, 73/514.38, 493
See application file for complete search history.

(56) References Cited

U.S. PATENT DOCUMENTS

| | | | | |
|---|---|---|---|---|
| 4,825,696 A | * | 5/1989 | Seipler | 73/514.33 |
| 4,987,781 A | * | 1/1991 | Reimann | 73/514.33 |
| 5,313,836 A | * | 5/1994 | Fujii et al. | 73/514.16 |
| 5,415,043 A | * | 5/1995 | Zabler et al. | 73/514.38 |
| 5,429,736 A | * | 7/1995 | Shimada et al. | 204/406 |
| 5,828,116 A | * | 10/1998 | Ao | 257/417 |
| 6,170,332 B1 | * | 1/2001 | MacDonald et al. | 73/514.38 |
| 6,311,556 B1 | * | 11/2001 | Lefort et al. | 73/514.29 |
| 6,360,605 B1 | * | 3/2002 | Pinter et al. | 73/514.38 |
| 6,694,814 B1 | * | 2/2004 | Ishio | 73/514.32 |

FOREIGN PATENT DOCUMENTS

| JP | 06-268237 | 9/1994 |
|---|---|---|
| JP | 07-225240 | 8/1995 |
| JP | 08-111535 | 4/1996 |
| JP | 11-248737 | 9/1999 |

\* cited by examiner

*Primary Examiner*—Hezron Williams
*Assistant Examiner*—John C Hanley
(74) *Attorney, Agent, or Firm*—Rabin & Berdo, P.C.

(57) ABSTRACT

An acceleration sensor capable of standing a great acceleration is to be provided. It is configured of a mounting board and a sensor chip in which the sensor chip is formed of a weight, a beam and a frame. Then, the weight is surrounded by the frame. The weight is joined to the frame by a plurality of the beams, and the weight is separated from the board by being supported by the beams. Additionally, a thin, rectangular stopper is disposed on the mounting board right under the weight.

4 Claims, 2 Drawing Sheets

ACCELERATION SENSOR

Priority is claimed of U.S. Provisional Application Ser. No. 60/413,912, filed Sep. 27, 2002.

BACKGROUND OF THE INVENTION

1. Field of the Invention

The present invention relates to an MEMS type acceleration sensor having a weight structure.

2. Description of the Invention

In recent years, attention is focused on a technique of fabricating a significantly fine structure having a size of about a few 100 μm with the use of the micromachining technology to which the semiconductor micromachining technology is applied. For this microstructure, applications to an optical switch and a radio-frequency (RF) component are investigated in various sensors and the field of optical communications. Generally, since these components applied with micromachining are fabricated with the use of the Si process, they can be integrated with a signal processing LSI on a chip. Consequently, a system having a certain function is configured on a chip. Accordingly, the device having this function is called Micro-Electrical-Mechanical-Systems, MEMS, in the Unite States and Micro-System-Technology, MIST, in Europe.

One of the MEMS components widely used is an acceleration sensor. The acceleration sensor is widely applied to a supplemental restraint system for automobiles, a measuring system of information about underground environments such as earthquake activity, and an earthquake-proof system for IT components. For example, JP-A-7-225240 discloses a piezo acceleration sensor among the MEMS components. The structure is that a sensor chip is mounted on a mounting board by an adhesive of a molding resin, in which the sensor chip is formed of a weight, a beam and a frame. Then, the weight is surrounded by the frame. The weight is joined to the frame by a plurality of the beams, and the weight is separated from the board by being supported by the beams. In the acceleration sensor, the weight senses acceleration toward the mounting board in the vertical direction, and the weight moves vertically. The resistance value of the beams supporting the weight is varied at this time, and thus current is carried through the beams to sense the resistance value for measuring the acceleration.

However, the traditional structure has a problem that bonding the sensor chip to the mounting board causes the molding resin to flow into the inside of the frame, the resin reaches under the weight and the weight is bonded to the mounting board.

It is possible to avoid the influence by reducing the thickness of the weight or raising the height of the frame to have space between the weight and the mounting board even though the molding resin flows into the inside of the frame. However, when the distance between the weight and the mounting board is increased too much, a problem arises that the weight greatly moves in the direction of the mounting board and en excessive stress is applied to the beams supporting the weight to destroy the beams in the case where a great acceleration is applied.

SUMMARY OF THE INVENTION

In order to achieve an object for those described above, an acceleration sensor of the invention is configured of a mounting board and a sensor chip in which the sensor chip is formed of a weight, a beam and a frame. Then, the weight is surrounded by the frame. The weight is joined to the frame by a plurality of the beams, and the weight is separated from the substrate by being supported by the beams. Furthermore, a thin rectangular stopper is disposed on the mounting board right under the weight.

DESCRIPTION OF THE PREFERRED EMBODIMENTS (First Embodiment)

Figure 1:
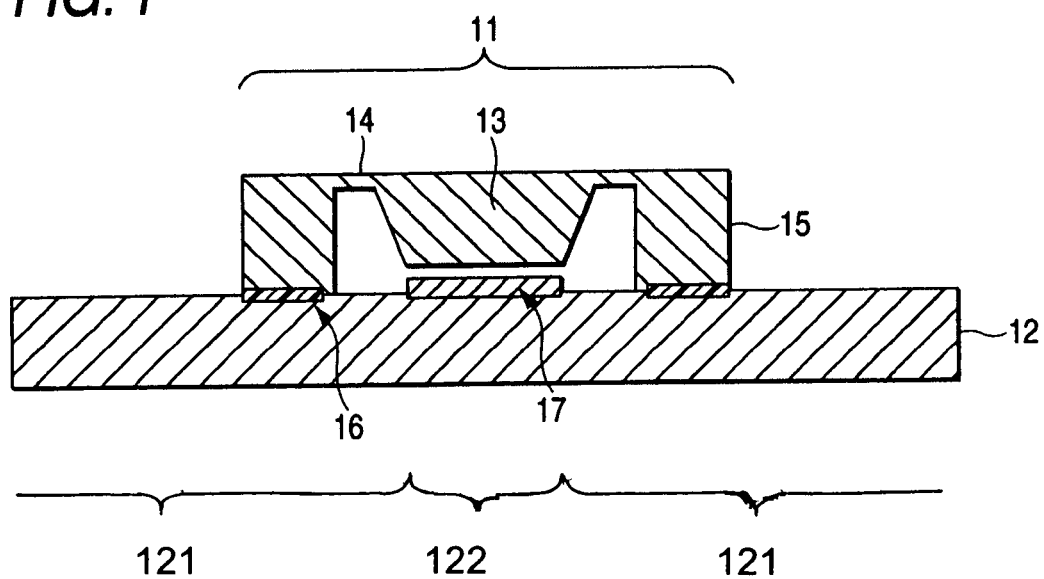
FIG. 1 is a cross section illustrating a first embodiment according to the invention.

FIG. 1 is a cross section illustrating a first embodiment according to the invention. The first embodiment according to the invention will be described with FIG. 1. An acceleration sensor of the first embodiment according to the invention is configured of a mounting board 12 and a sensor chip 11 in which the mounting board 12 is bonded to the sensor chip 11 with a molding resin 16 region and the sensor chip 11 is formed of a weight 13, a beam 14 and a frame 15. Then, the weight 13 is surrounded by the frame 15. The weight 13 is joined to the frame 15 by a plurality of the beams 14, and the weight 13 is separated from the mounting board 12 by being supported by the beams 15. In the acceleration sensor, the weight 13 senses acceleration toward the mounting board 12 in the vertical direction, and the weight 13 moves vertically. The resistance value of the beams 14 supporting the weight 13 is varied at this time, and thus current is carried through the beams 14 to sense the resistance value for measuring the acceleration. In the first embodiment according to the invention, a thin, rectangular stopper 17 is disposed on the mounting board 12 over a first region 122 of the surface of the mounting board right under the weight 13, while the sensor chip is attached over a second region 121 of the top surface of the mounting board 12. The stopper 17 is disposed to reduce the distance between the weight 13 and the mounting board 12. Therefore, even though a great acceleration is applied to the weight 13, the weight 13 does not move more than a fixed distance in the direction of the mounting board because the stopper 17 on the mounting board 12 contacts the weight 13. Accordingly, the possibility that an excessive stress is applied to the beams 14 supporting the weight 13 to destroy the beams 14 is eliminated. In addition, the possibility that the molding resin 16 bonding the frame 15 to the mounting board 12 flows into the inside of the frame 15 and the molding resin 16 reaches under the weight 13 to bond the mounting board 12 to the weight 13 does not occur because the stopper 17 is raised from the mounting board 12.

FIG. 1 shows that a distance between the top surface of the sensor chip 11 and the bottom surface of the weight 13 is shorter than a distance between the top surface of the sensor chip 11 and the bottom surface of the frame 15.

(Second Embodiment)

Figure 2:
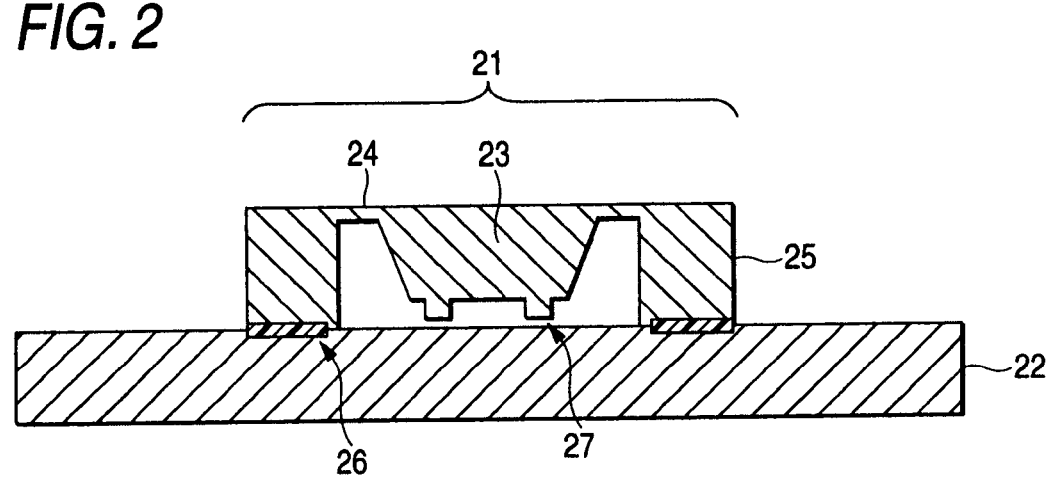
FIG. 2 is a cross section illustrating a second embodiment according to the invention.

FIG. 2 is a cross section illustrating a second embodiment according to the invention. The second embodiment according to the invention will be described with FIG. 2. An acceleration sensor of the second embodiment according to the invention has nearly the same structure as that of the first embodiment, which has the structure that a sensor chip 21 formed of a weight 23, a beam 24 and a frame 25 is bonded to a mounting board 22 with a molding resin 26. The acceleration sensor of the second embodiment does not have the stopper 17 in the first embodiment. Instead, projections 27 are disposed on the surface of the weight 23 facing the mounting board 22. Therefore, as similar to the first embodiment, even though a great acceleration is applied to the weight 23, the weight 23 does not move more than a fixed distance in the direction of the mounting board 22 because the projections 27 disposed on the weight 23 contact the mounting board 32. Accordingly, the possibility that an excessive stress is applied to the beams 24 supporting the weight 23 to destroy the beams 24 is eliminated.

(Third Embodiment)

Figure 3:
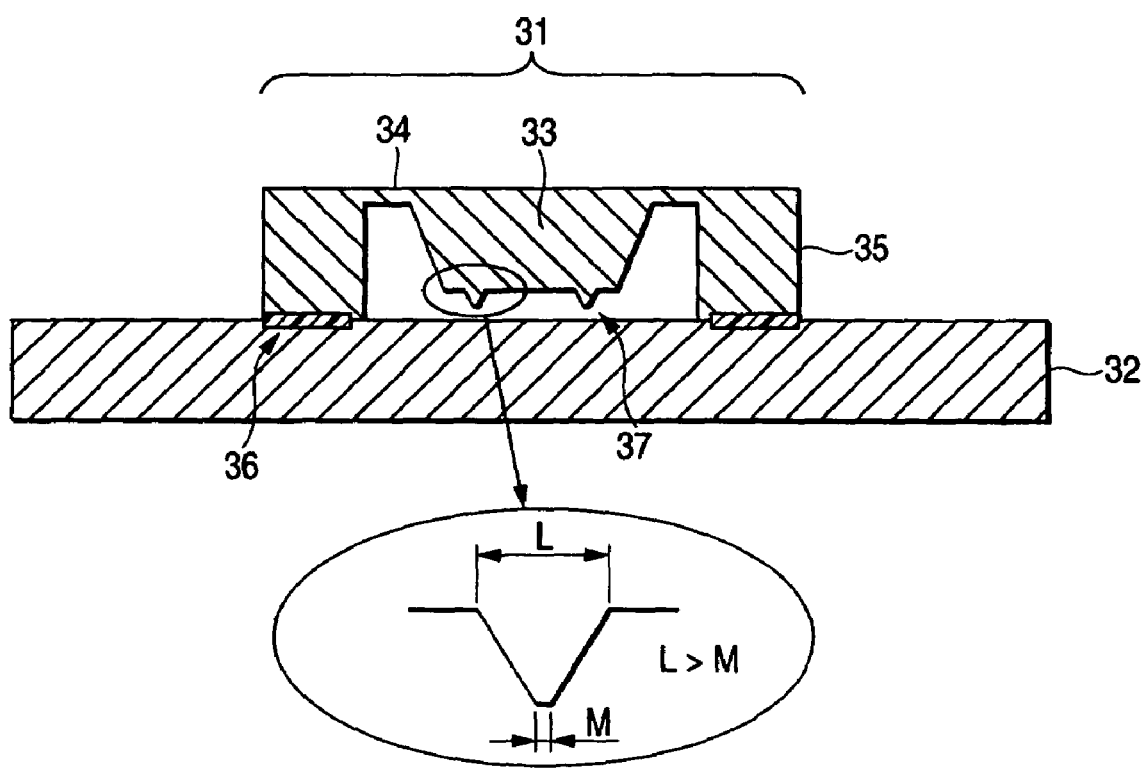
FIG. 3 is a cross section illustrating a third embodiment according to the invention.

FIG. 3 is a cross section illustrating a third embodiment according to the invention. The third embodiment according to the invention will be described with FIG. 3. An acceleration sensor of the third embodiment according to the invention has nearly the same structure as that of the second embodiment, which has the structure that a sensor chip 31 formed of a weight 33, a beam 34 and a frame 35 is bonded to a mounting board 32 with a molding resin 36. In the acceleration sensor of the third embodiment, the diameter (M) of the tip end part of a projection 37 mounted on the weight 33 is smaller than the diameter (L) of the base part of the projection 37. More specifically, the form of the projection 37 is a cone shape or a pyramid shape where the surface mounted on the weight 33 is the bottom. The third embodiment has the same advantage as that of the second embodiment because the projections 37 are disposed on the surface of the weight 33 facing the mounting board 32. Additionally, since the tip end part of the projections 37 is smaller than the base part of the projections 37, the molding resin 36 is hard to attach to the projections 33 even though the molding resin 36 bonding the frame 35 to the mounting board 32 flows into the inside of the frame 35 and the molding resin 36 reaches under the weight 33. Therefore, an advantage to reduce the possibility that the mounting board 32 is bonded to the weight 33 can be expected.

As described above, in the invention, an excessive stress be prevented from being applied to the beams because the moving of the weight is limited toward the mounting board in vertical direction due to acceleration. Therefore, the ms can be prevented from being destroyed by stress.

What is claimed is:

1. An acceleration sensor comprising:
a mounting board having a top surface which includes a first region and a second region, wherein a level of the first region of the top surface is substantially the same as a level of the second region of the of the top surface;
a stopper attached on the first region of the top surface so that the stopper is projected from the top surface; and
a sensor chip which has a top surface and a bottom surface, the sensor chip including a weight having a top surface which is arranged in the top surface of the sensor chip and a bottom surface which faces to the top surface of the mounting board, a frame which has a top surface which is arranged in the top surface of the sensor chip and a bottom surface which is arranged in the bottom surface of the sensor chip, and a beam which connects the weight to the frame, wherein the bottom surface of the weight faces to the stopper, and wherein the bottom surface of the frame is attached on the second region of the mounting board,
wherein a distance between the top surface of the sensor chip and the bottom surface of the weight is shorter than a distance between the top surface of the sensor chip and the bottom surface of the frame.

2. The acceleration sensor of claim 1, wherein the sensor chip is bonded to the top surface of the mounting board by a bonding resin.

3. The acceleration sensor of claim 1, wherein the sensor chip does not cover an entire top surface of the mounting board.

4. The acceleration sensor of claim 1, wherein the stopper is a unitary and integral part by itself that is disposed on the mounting board.

\* \* \* \* \*